United States Patent
Tseng

(10) Patent No.: US 10,792,769 B2
(45) Date of Patent: Oct. 6, 2020

(54) WELDING FLUX FOR DUPLEX STAINLESS STEEL

(71) Applicant: NATIONAL PINGTUNG UNIVERSITY OF SCIENCE & TECHNOLOGY, Pingtung County (TW)

(72) Inventor: Kuang-Hung Tseng, Pingtung County (TW)

(73) Assignee: NATIONAL PINGTUNG UNIVERSITY OF SCIENCE & TECHNOLOGY, Pingtung County (TW)

(*) Notice: Subject to any disclaimer, the term of this patent is extended or adjusted under 35 U.S.C. 154(b) by 294 days.

(21) Appl. No.: 16/027,810

(22) Filed: Jul. 5, 2018

(65) Prior Publication Data

US 2019/0176272 A1  Jun. 13, 2019

(30) Foreign Application Priority Data

Dec. 11, 2017  (TW) .............................. 106143400 A

(51) Int. Cl.
B23K 35/362  (2006.01)
B23K 35/36  (2006.01)
B23K 103/04  (2006.01)

(52) U.S. Cl.
CPC ........ *B23K 35/362* (2013.01); *B23K 35/3602* (2013.01); *B23K 2103/05* (2018.08)

(58) Field of Classification Search
CPC ............................ B23K 35/3602; B23K 35/36
See application file for complete search history.

(56) References Cited

U.S. PATENT DOCUMENTS

| | | | | |
|---|---|---|---|---|
| 4,066,478 A | * | 1/1978 | De Haeck | B23K 35/3602 148/26 |
| 2006/0273077 A1 | * | 12/2006 | Soltis | B23K 35/368 219/137 WM |
| 2010/0068559 A1 | * | 3/2010 | Muthukumaran | B23K 9/167 428/684 |
| 2010/0288397 A1 | * | 11/2010 | Tseng | B23K 35/362 148/26 |
| 2015/0151339 A1 | * | 6/2015 | Bruck | B23K 26/144 134/4 |

* cited by examiner

*Primary Examiner* — Keith D. Hendricks
*Assistant Examiner* — Jerry J Yeh
(74) *Attorney, Agent, or Firm* — WPAT, PC

(57) ABSTRACT

A welding flux for duplex stainless steel is used to solve the problem of insufficient penetration depth of a weld formed between two jointed workpieces when workpieces with a thickness above 3 mm is joined by TIG welding. The welding flux for duplex stainless steel includes 25-35 wt % of $SiO_2$, 20-25 wt % of $Cr_2O_3$, 10-20 wt % of $MoO_3$, 10-15 wt % of NiO, 5-10 wt % of FeO, 5-10 wt % of $Co_3O_4$, 5-10 wt % of $MnO_2$ and 3-5 wt % of CuO.

3 Claims, 4 Drawing Sheets

WELDING FLUX FOR DUPLEX STAINLESS STEEL

CROSS REFERENCE TO RELATED APPLICATIONS

The application claims the benefit of Taiwan application serial No. 106143400, filed Dec. 11, 2017, the entire contents of which are incorporated herein by reference.

BACKGROUND OF THE INVENTION

1. Field of the Invention

The present invention generally relates to a welding flux and, more particularly, to a welding flux for duplex stainless steel.

2. Description of the Related Art

Duplex stainless steel belonging to Fe—Cr—Ni stainless steel has a two-phase microstructure consisting of approximately 50% austenitic and 50% ferritic. Although not formally defined, it is generally accepted that the lesser phase will be at least 30% by volume. Duplex stainless steel has not only excellent atmospheric corrosion resistance and pitting resistance, but also great mechanical strength, fracture toughness and susceptibility to chloride stress corrosion cracking. That is, duplex stainless steel is the steel with advantages of all of corrosion resistance, mechanical strength and formability, and thus is widely applied to petrochemical equipment, desalination plant, oil and gas pipelines, pressure vessel, paper machinery and heat exchanger.

Tungsten inert gas (TIG) welding is a high-quality arc welding process, and is mainly applied to join metals such as aluminum alloy, titanium alloy, stainless steel and nickel-based superalloy. The TIG welding is carried out under a protective atmosphere of an inert gas (e.g. argon gas, helium gas or the mixture thereof), with an electric arc generated by a tungsten electrode as a heat source for melting the joint of two workpieces. A conventional welding rod can be applied to the joint of the two workpieces, such that the conventional welding rod is melted to form a molten pool at the joint of the two workpieces. The molten pool is then cooled down to room temperature, resulting in a weld which tightly joins the two workpieces. However, since the power density of the heat source used in the TIG welding is not high enough, the formed molten pool is wide and shallow, resulting in a resultant weld with insufficient penetration depth when the TIG welding is applied to join the two workpieces with thickness above 3 mm.

Referring to FIG. 1a, to eliminate the problem of forming the wide, shallow molten pool, before joining two workpieces 91, 91' with thickness above 3 mm, a side 91 of a workpiece 9 and a side 91' of another workpiece 9' are first milled to form bevel faces 92, 92', respectively. Referring to FIGS. 1b and 1c, a groove is formed at the butt joint of the bevel faces 92, 92' of the two workpieces 9, 9' for carrying out the TIG welding with the use of the conventional welding rod "W", as well as the tungsten electrode "E". A weld 93 is therefore formed after the TIG welding. The formation of the bevel faces 92, 92' increases the penetration depth of the weld 93. However, the formation of the bevel faces 92, 92' also increases the width of the weld 93 formed between the joined workpieces 9, 9'. Besides, a larger heat-affected zone (HAZ) is formed at the joint of the two workpieces 9, 9', resulting in a decrease of mechanical strength of the jointed workpieces 9, 9'. Moreover, the larger HAZ also causes the problems such as severe thermal deformation, residual stress and even the decrease of the corrosion resistance. Moreover, the formation of the bevel faces 92, 92' also extends welding time and increases manufacturing costs.

In light of this, it is necessary to provide a welding flux for duplex stainless steel.

SUMMARY OF THE INVENTION

It is therefore an objective of the present invention to provide a welding flux for duplex stainless steel. By the use of the welding flux, a deep, narrow weld can be formed between two jointed workpieces, and thus, formation of a bevel faces of the two workpieces before the welding procedure can be omitted.

One embodiment of the present invention discloses a welding flux for duplex stainless steel. The welding flux for duplex stainless steel can include 25-35 wt % of $SiO_2$, 20-25 wt % of $Cr_2O_3$, 10-20 wt % of $MoO_3$, 10-15 wt % of NiO, 5-10 wt % of FeO, 5-10 wt % of $Co_3O_4$, 5-10 wt % of $MnO_2$ and 3-5 wt % of CuO. Accordingly, when the welding flux for duplex stainless steel with specific weight percentages of $SiO_2$, $Cr_2O_3$, $MoO_3$, NiO, FeO, $Co_3O_4$, $MnO_2$ and CuO is applied to join workpieces made of duplex stainless steel, a weld formed between the two joined workpieces has an increased depth/width ratio (D/W ratio). Therefore, risk of problems such as thermal deformation and residual stress can be reduced. Moreover, when the welding flux for duplex stainless steel is applied to join the workpieces with thickness above 3 mm, the formation of the bevel faces of the two workpieces before the welding procedure can also be omitted, solving the problems of decrease of mechanical strength, as well as large HAZ. In addition, omitting the formation of the bevel faces of the two workpieces can also reduce welding time and manufacturing costs.

In an example, the sum of the weight percentage of NiO and the weight percentage of $MnO_2$ is 15-20% by weight of the welding flux for duplex stainless steel. Thus, when the welding flux for duplex stainless steel is applied to join the workpieces made of duplex stainless steel, the ferrite/austenite ratio of the weld can be about 50/50. That is, the weld formed between the two jointed workpieces, same as the two workpieces made of duplex stainless steel, has excellent corrosion resistance.

In an example, the welding flux for duplex stainless steel includes a plurality of powdered particles each having an average diameter of 50-90 μm. Thus, the welding flux for duplex stainless steel can be a homogeneous mixture with great uniformity. As such, the welding flux for duplex stainless steel can be easily spread on surface of the two workpieces. Also, the welding flux for duplex stainless steel can be easily melted by a heat source, and the penetration depth of the resultant weld can therefore be improved.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE INVENTION

As used in the present invention, duplex stainless steel refers to, but not limited to, standard duplex stainless steel species, such as UNS S32101, UNS S32304, UNS S32205 and UNS S32550, which can be appreciated by a person having ordinary skill in the art.

A welding flux for duplex stainless steel according to an embodiment of the present invention can include silicon dioxide ($SiO_2$), chromium(III) oxide ($Cr_2O_3$), molybdenum trioxide ($MoO_3$), nickel(II) oxide (NiO), iron(II) oxide (FeO), cobalt(II,III) oxide ($Co_3O_4$), manganese dioxide ($MnO_2$) and copper(II) oxide (CuO). The welding flux can be used in TIG welding for joining two workpieces with thickness above 3 mm.

Specifically, the welding flux for duplex stainless steel of the present invention includes 25-35 wt % of $SiO_2$, 20-25 wt % of $Cr_2O_3$, 10-20 wt % of $MoO_3$, 10-15 wt % of NiO, 5-10 wt % of FeO, 5-10 wt % of $Co_3O_4$, 5-10 wt % of $MnO_2$ and 3-5 wt % of CuO. With such performance, a weld formed between the two joined workpieces can have an increased D/W ratio. Moreover, the sum of the weight percentage of NiO and the weight percentage of $MnO_2$ is 15-20% by weight of the welding flux for duplex stainless steel, and thus the weld formed between the two jointed workpieces can have a favorable ratio between ferrite and austenite (ferrite/austenite ratio), assuring the weld can have excellent corrosion resistance. In addition, the welding flux for duplex stainless steel includes a plurality of powdered particles each having an average diameter of 50-90 μm, and thus the welding flux for duplex stainless steel can be a homogeneous mixture with great uniformity. As such, the welding flux for duplex stainless steel can be easily spread on the surface of the two workpieces. Also, the welding flux for duplex stainless steel can be easily melted by a heat source, and the weld formed between the two workpieces can therefore has an increased penetration depth.

Figure 1A:
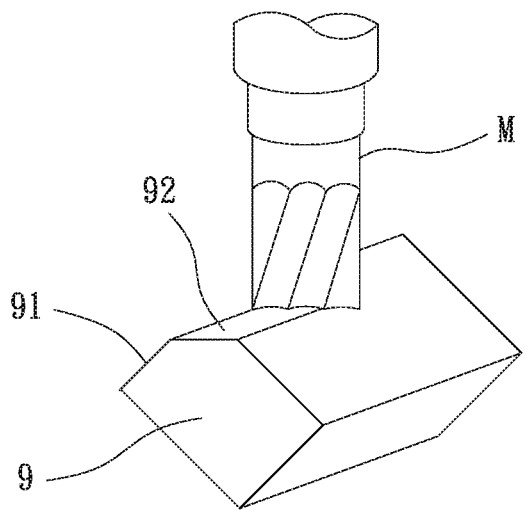
FIG. 1a depicts pre-processing on a workpiece to be joined with another workpiece by the TIG welding.
Figure 1B:
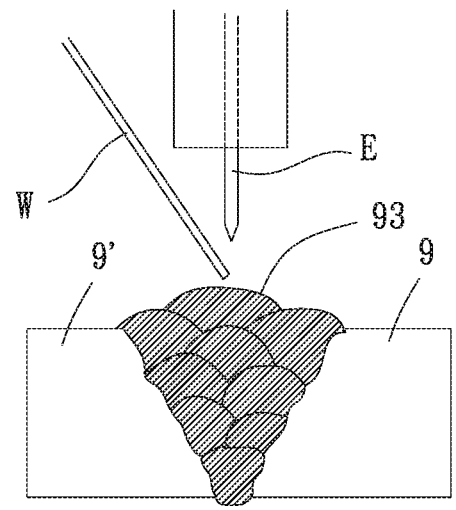
FIG. 1b depicts a cross-sectional view of two workpieces being joined by the TIG welding.
Figure 1C:
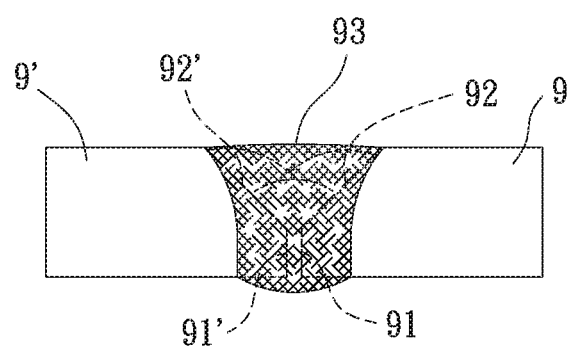
FIG. 1c depicts a cross-sectional view of a weld formed between the two jointed workpieces.
Figure 2:
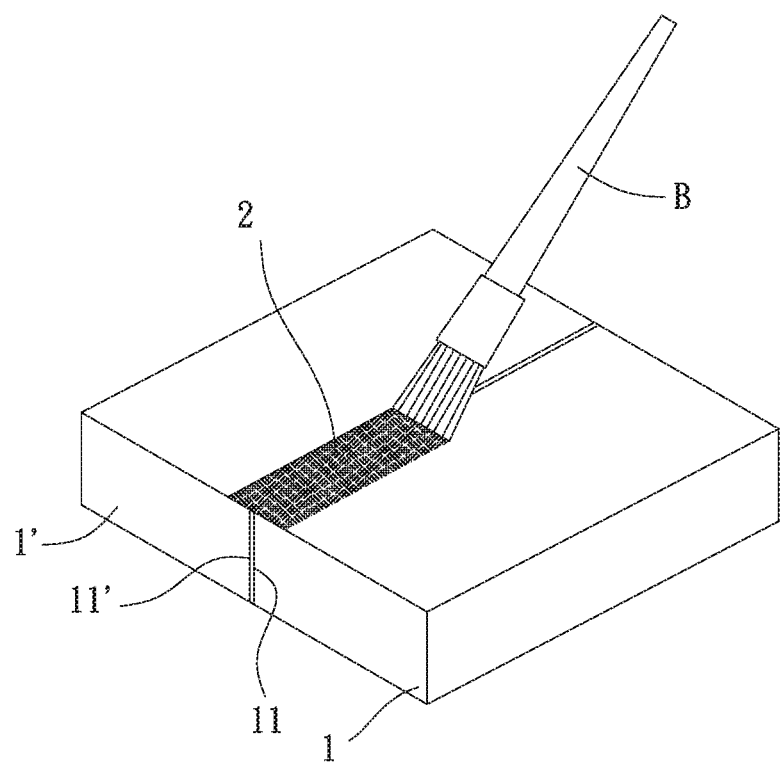
FIG. 2 depicts the application of the welding flux for duplex stainless steel according to the present invention.

Referring to FIG. 2, before carrying out the welding procedure, the respective sides 11, 11' of two workpieces 1, 1' can be abutted with each other, and the welding flux for duplex stainless steel 2 can be applied by a brush "B" on the surface of the two workpieces 1, 1'. The welding procedure can be carried out afterwards.

Figure 3A:
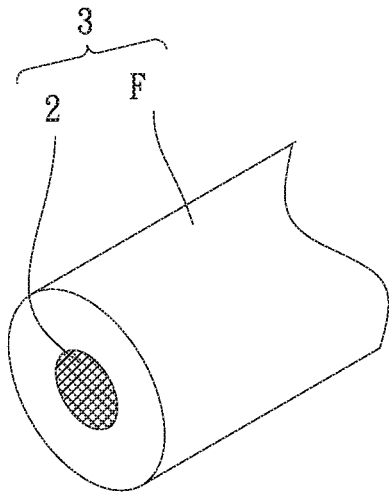
FIG. 3a depicts a perspective view of a flux-cored wire utilizing the welding flux for duplex stainless steel according to the present invention.
Figure 3B:
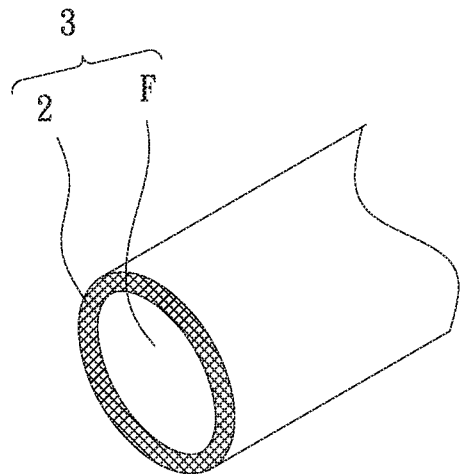
FIG. 3b depicts a perspective view of a flux-coated rod utilizing the welding flux for duplex stainless steel according to the present invention.
Figure 3C:
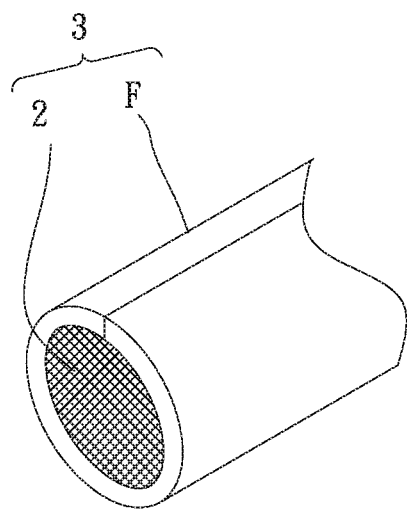
FIG. 3c depicts a perspective view of another flux-cored wire utilizing the welding flux for duplex stainless steel according to the present invention.
Figure 3D:
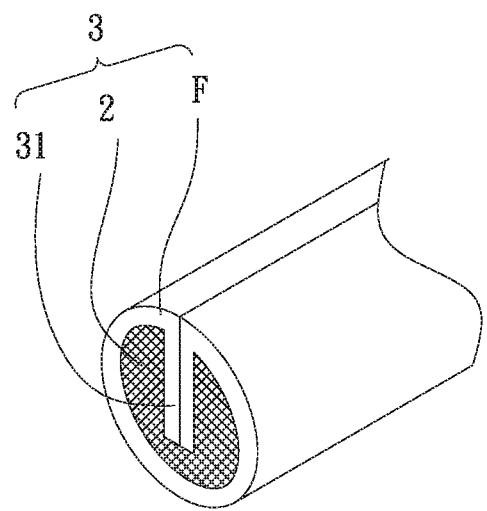
FIG. 3d depicts a perspective view of still another flux-cored wire utilizing the welding flux for duplex stainless steel according to the present invention.

Referring to FIGS. 3a-3d, the welding flux for duplex stainless steel 2 can be joined with a filler metal "F" to produce a welding flux-containing filler metal 3, which is used in the TIG welding. The welding flux-containing filler metal 3 can be produced by filling the welding flux for duplex stainless steel 2 in the hollow, cylindrical filler metal "F" as shown in FIG. 3a; or by coating the welding flux for duplex stainless steel 2 around the cylindrical filler metal "F" as shown in FIG. 3b. Alternatively, a sheet of filler metal "F" is rolled into an annular form and envelopes the welding flux for duplex stainless steel 2 as shown in FIG. 3c. Furthermore, a sheet of filler metal "F" is rolled into an annular form and envelopes the welding flux for duplex stainless steel 2, with a filler metal "F" including at least one inwardly extending end 31 received in the welding flux for duplex stainless steel 2 as shown in FIG. 3d. Providing with the welding flux-containing filler metal 3, the welding flux for duplex stainless steel 2 can be utilized in an automatic operation, thus significantly improving production efficiency.

Figure 4A:
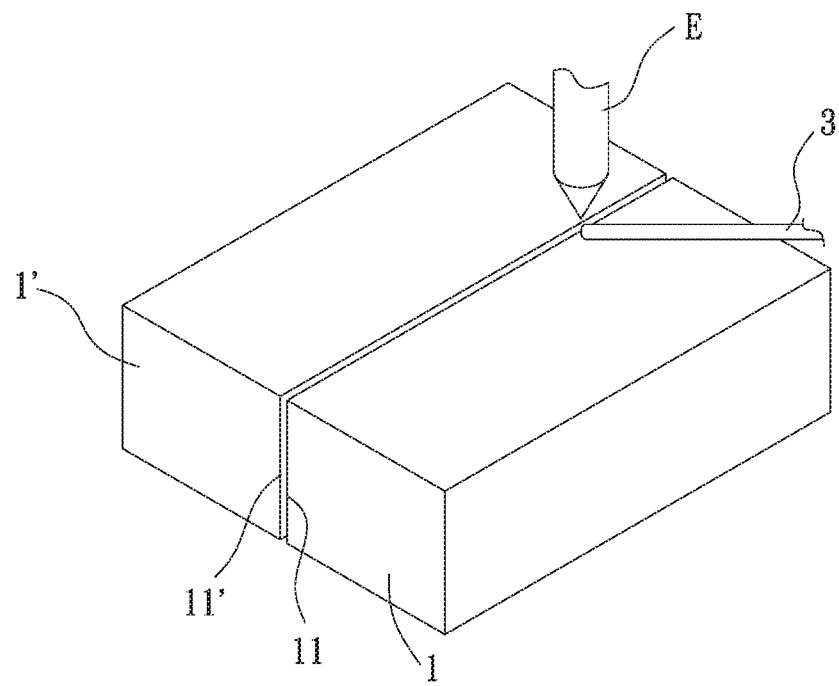
FIG. 4a depicts a welding operation using the flux-cored wire or flux-coated rod utilizing the welding flux for duplex stainless steel according to the present invention.
Figure 4B:
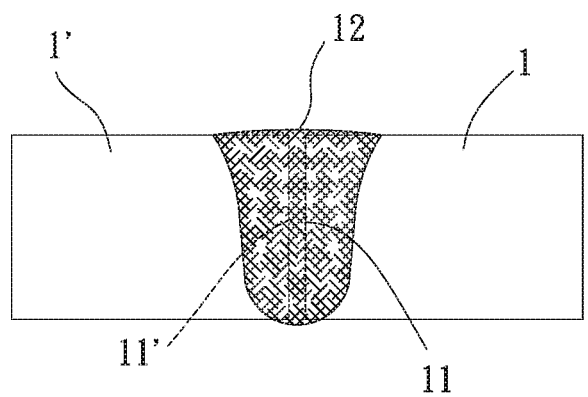
FIG. 4b depicts a cross-sectional view of a weld formed by the flux-cored wire or flux-coated rod described above.

Referring to FIG. 4a, the welding flux-containing filler metal 3 can be utilized with a tungsten electrode "E" for providing a heat source, such that the filler metal "F" and the welding flux for duplex stainless steel 2 melt together to form the molten pool between the sides 11, 11' of the two workpieces 1, 1'. The molten pool is cooled down to room temperature, resulting in a weld between the two jointed workpieces 1, 1'. As shown in FIG. 4b, a deep, narrow weld 12 with a high D/W ratio is thus formed.

To validate the welding flux for duplex stainless steel according to the present invention can be applied to join the two workpieces made of duplex stainless steel to form the weld with a high D/W ratio, as well as the favorable ferrite/austenite ratio, the following trial is carried out.

In this trial, UNS S32205 duplex stainless steel plates with thickness being 5.5 mm are used as the workpieces. The welding flux for duplex stainless steel referred to TABLE 1 forms a paste-like slurry by being dispersed in a volatile organic solvent such as methanol, acetone and isopropanol, and is spread on the surface of the two workpieces. The TIG welding is carried out after the volatile organic solvent is completely evaporated. Group A0 is the group in which the TIG welding is carried out without spreading the welding flux for duplex stainless steel on the surface of the two workpieces.

TABLE 1

| Group | $SiO_2$ (wt %) | $Cr_2O_3$ (wt %) | $MoO_3$ (wt %) | NiO (wt %) | FeO (wt %) | $Co_3O_4$ (wt %) | $MnO_2$ (wt %) | CuO (wt %) |
|---|---|---|---|---|---|---|---|---|
| A1 | 30 | 23 | 15 | 12 | 7 | 5 | 5 | 3 |
| A2 | 33 | 20 | 17 | 10 | 7 | 5 | 5 | 3 |
| A3 | 30 | 23 | 12 | 10 | 7 | 10 | 5 | 3 |
| A4 | 25 | 20 | 20 | 10 | 10 | 7 | 5 | 3 |

TABLE 1-continued

| Group | SiO$_2$ (wt %) | Cr$_2$O$_3$ (wt %) | MoO$_3$ (wt %) | NiO (wt %) | FeO (wt %) | Co$_3$O$_4$ (wt %) | MnO$_2$ (wt %) | CuO (wt %) |
|---|---|---|---|---|---|---|---|---|
| A5 | 27 | 20 | 20 | 10 | 5 | 5 | 8 | 5 |
| A6 | 35 | 20 | 12 | 10 | 5 | 5 | 10 | 3 |

After the TIG welding, cross section of the jointed workpieces of groups A0-A6 is obtained. The penetration depth and the bead width of the resultant weld of each jointed workpieces are recorded. The D/W ratio of the weld of each jointed workpieces is calculated. Moreover, the ferrite level of the weld of each jointed workpieces is also measured, and the ferrite/austenite ratio is shown as TABLE 2.

TABLE 2

| Group | Penetration depth (mm) | Bead width (mm) | D/W ratio | Ferrite/austenite ratio |
|---|---|---|---|---|
| A0 | 1.9 | 9.2 | 0.21 | 65/35 |
| A1 | 5.7 | 6.9 | 0.83 | 42/58 |
| A2 | 5.9 | 6.4 | 0.92 | 46/54 |
| A3 | 5.8 | 6.2 | 0.94 | 47/53 |
| A4 | 5.1 | 6.1 | 0.84 | 44/56 |
| A5 | 5.4 | 6.5 | 0.83 | 43/57 |
| A6 | 6.0 | 7.1 | 0.85 | 41/59 |

Referring to TABLE 2, by the use of the welding flux for duplex stainless steel, the D/W ratio of the weld formed between the two jointed workpieces can be effectively increased (to more than 0.8), and the ferrite/austenite ratio of the weld formed between the two jointed workpieces can also be remained to be approximately 50/50.

Accordingly, when the welding flux for duplex stainless steel with specific weight percentage of SiO$_2$, Cr$_2$O$_3$, MoO$_3$, NiO, FeO, Co$_3$O$_4$, MnO$_2$ and CuO is applied to join workpieces made of duplex stainless steel, a weld formed between the two joined workpieces has an increased D/W ratio. Therefore, the problems such as thermal deformation and residual stress can be reduced. Moreover, when the welding flux for duplex stainless steel is applied to join the workpieces with thickness above 3 mm, the formation of bevel faces of the two workpieces can also be omitted, solving the problems such as the decrease of mechanical strength and the large HAZ. In addition, omitting the formation of the bevel faces of the two workpieces can also reduce welding time and manufacturing costs.

Although the invention has been described in detail with reference to its presently preferable embodiment, it will be understood by one of ordinary skill in the art that various modifications can be made without departing from the spirit and the scope of the invention, as set forth in the appended claims.

What is claimed is:

1. A welding flux for duplex stainless steel comprising 25-35 wt % of SiO$_2$, 20-25 wt % of Cr$_2$O$_3$, 10-20 wt % of MoO$_3$, 10-15 wt % of NiO, 5-10 wt % of FeO, 5-10 wt % of Co$_3$O$_4$, 5-10 wt % of MnO$_2$ and 3-5 wt % of CuO.

2. The welding flux for duplex stainless steel as claimed in claim 1, wherein the sum of the weight percentage of NiO and the weight percentage of MnO$_2$ is 15-20% by weight of the welding flux for duplex stainless steel.

3. The welding flux for duplex stainless steel as claimed in claim 1, wherein the welding flux for duplex stainless steel comprises a plurality of powdered particles having an average diameter of 50-90 μm.

* * * * *